United States Patent [19]
Du et al.

[11] Patent Number: 5,098,253
[45] Date of Patent: Mar. 24, 1992

[54] AUTOMATIC TOOL-EXCHANGING DEVICE

[75] Inventors: Chen-Chung Du, Shin Chu Hsien; Jinn-Fa Wu, Hsin Chu Hsien, both of Taiwan

[73] Assignee: Industrial Technology Research Institute, Hsin Chu Hsien, Taiwan

[21] Appl. No.: 587,984

[22] Filed: Sep. 25, 1990

[51] Int. Cl.$^5$ ............................................. B25J 17/02
[52] U.S. Cl. ..................................... 414/729; 901/29; 403/49; 403/350
[58] Field of Search .................. 414/729, 735; 901/29, 901/28, 40; 403/49, 321, 322, 324, 331, 350; 29/42, 48.5 A

[56] References Cited
U.S. PATENT DOCUMENTS
4,664,588 5/1987 Newell et al. ..................... 901/29 X Primary Examiner—Robert J. Spar
Assistant Examiner—Donald W. Underwood
Attorney, Agent, or Firm—Dvorak and Traub

[57] ABSTRACT

An automatic tool-exchanging device can be set on a robot for exchanging tools. It mainly comprises an upper and lower assemblies, and an engaging mechanism. The engaging mechanism includes a cam, which is to be driven with a double-acting pneumatic cylinder assembly. When the double-acting pneumatic cylinder is turned on, the upper and lower assemblies will be engaged together and generate a self-lock effect for safety; when the double-acting pneumatic cylinder is turned off, the two assemblies will be disengaged from each other.

1 Claim, 9 Drawing Sheets

F.B.D.2

F.B.D.1

AUTOMATIC TOOL-EXCHANGING DEVICE

BACKGROUND OF THE INVENTION

In the prior art automatic tool-exchanging device, the inside of the pneumatic cylinder is usually installed with a spring, which is used for preventing the device from disengagement in case of the pneumatic force being cut off because that the sudden disengagement might cause a danger; however, the spring might become useless in case of a metal fatigue taking place. The spring requires periodical inspection and maintenance, which are deemed inconvenient to a user.

SUMMARY

This invention relates to an automatic tool-exchanging device, and particularly to a tool-exchanging device which is mounted on the wrist of a robot. The device mainly comprises an upper and lower assemblies. The upper assembly is to be mounted on the wrist of a robot, and includes an upper part, a robot adapted plate, a pair of positioning pins, an engaging mechanism driven with a double-acting pneumatic cylinder, and an electric connector having several spring contact probes. The lower assembly for mounting tools includes a lower part, a tool adapted plate, a rotary shaft pin, and an electric connector having several receptacles. The engagement and disengagement of the upper and lower assemblies are controlled with an engaging mechanism, which includes a double-acting pneumatic cylinder to pull or push a cam to provide a locking or unlocking function between the two assemblies. The double-acting pneumatic cylinder according to the present invention needs no spring. The engaging mechanism would not cause the upper and lower assemblies to disengage from each other in case of the pneumatic force being lost because of a special cam having clamp effect and self-lock effect is mounted in the engaging mechanism.

The prime object of the present invention is to provide a cam which can have the upper and lower assemblies locked together, and to provide self-lock effect of the engaging mechanism preventing the two assemblies from disengagement in case of the pneumatic presure loss unintentionally. The mechanism self-lock method is deemed superior to the conventional device, in which a spring is installed; therefore, there would be no maintenance problem and no metal fatigue problem.

Another object of the present invention is to provide an engaging mechanism, the cam is actuated with double-acting pneumatic cylinder to have the two assemblies engaged or disengaged. The shaped of the cam is designed into an curve, whereby the operation of the engagement and disengagement will be done in a smooth manner.

BRIEF DESCRIPTION OF THE DRAWINGS

FIG. 1-2 is a top view of the upper assembly as shown in FIG. 1-1.

FIG. 1-3 is a front view of the upper assembly as shown in FIG. 1-1.

FIG. 2-1 is a perspective view of the lower assembly of the automatic tool-exchanging device according to the present invention.

FIG. 2-2 is a top view of the lower assembly as shown in FIG. 2-1.

FIG. 2-3 is a front view of the lower assembly as shown in FIG. 2-1.

FIG. 3 is a front view of the engaging mechanism for the upper and lower assemblies according to the present invention.

FIG. 6-1 is a side view of the engaging mechanism, being set at a position to be disengaged.

FIG. 6-2 is a side view of the engaging mechanism, being set in full engagement.

FIGS. 7-1 and 7-2 illustrate the force applied in the engaging mechanism according to the present invention.

DETAILED DESCRIPTION

Figure 1:
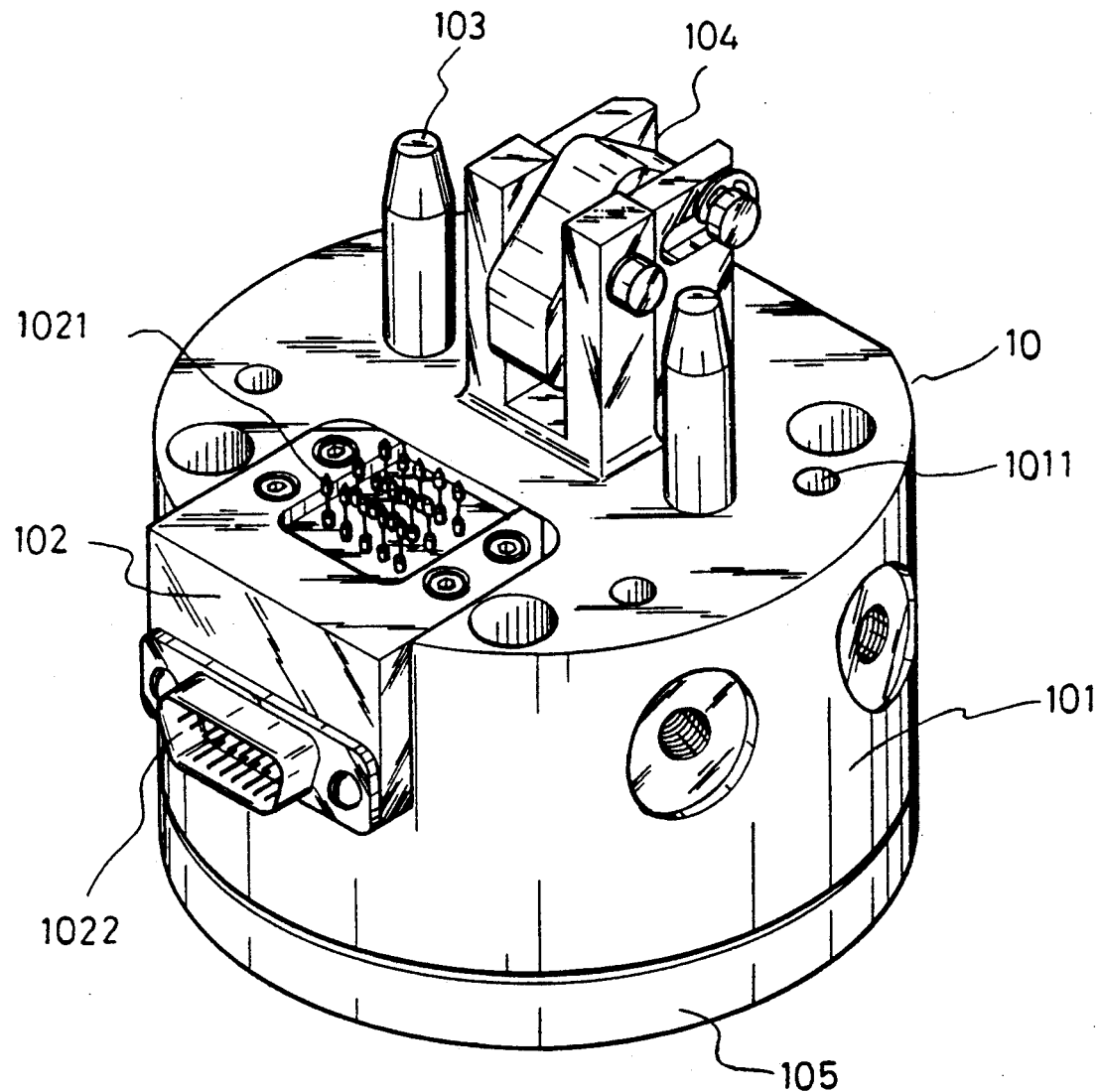
FIG. 1-1 is a perspective view of the upper assembly of the automatic tool-exchanging device according to the present invention.
Figures 1, 2:
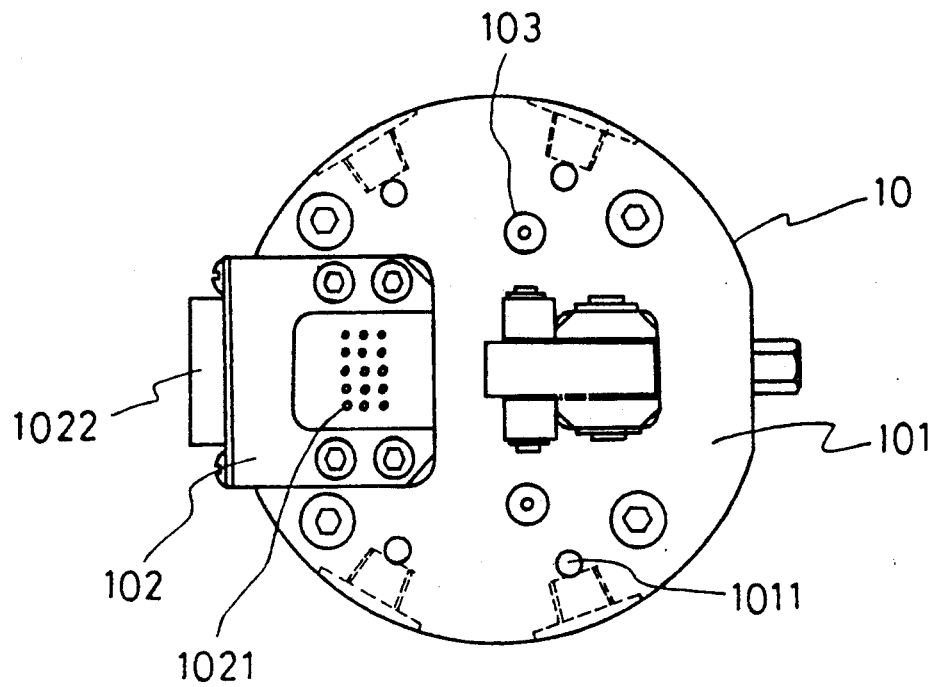
Figures 1, 2, 3:
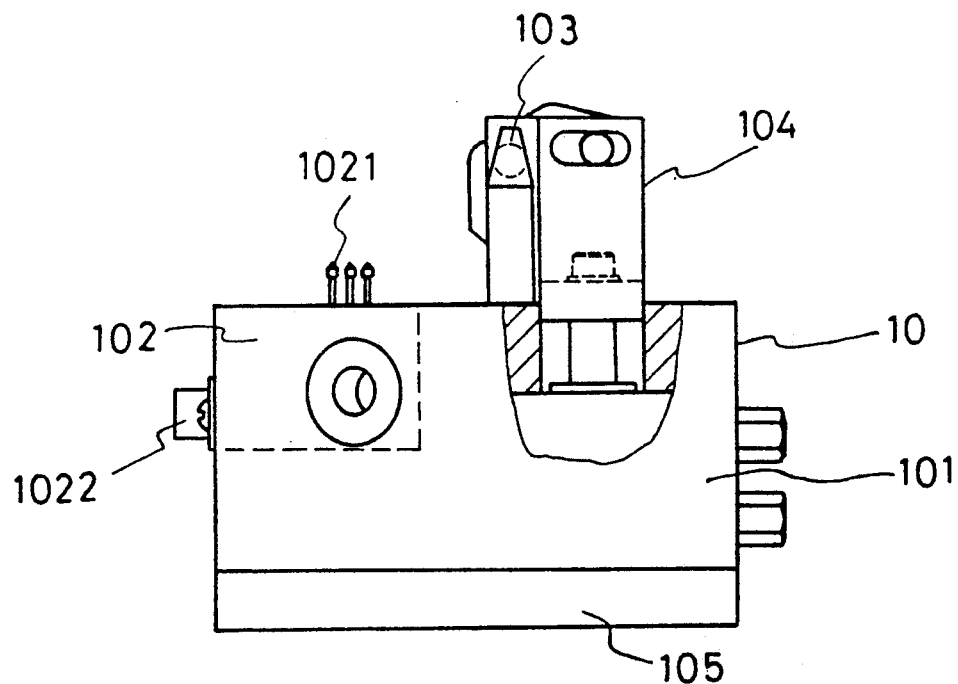
Figures 1, 2:
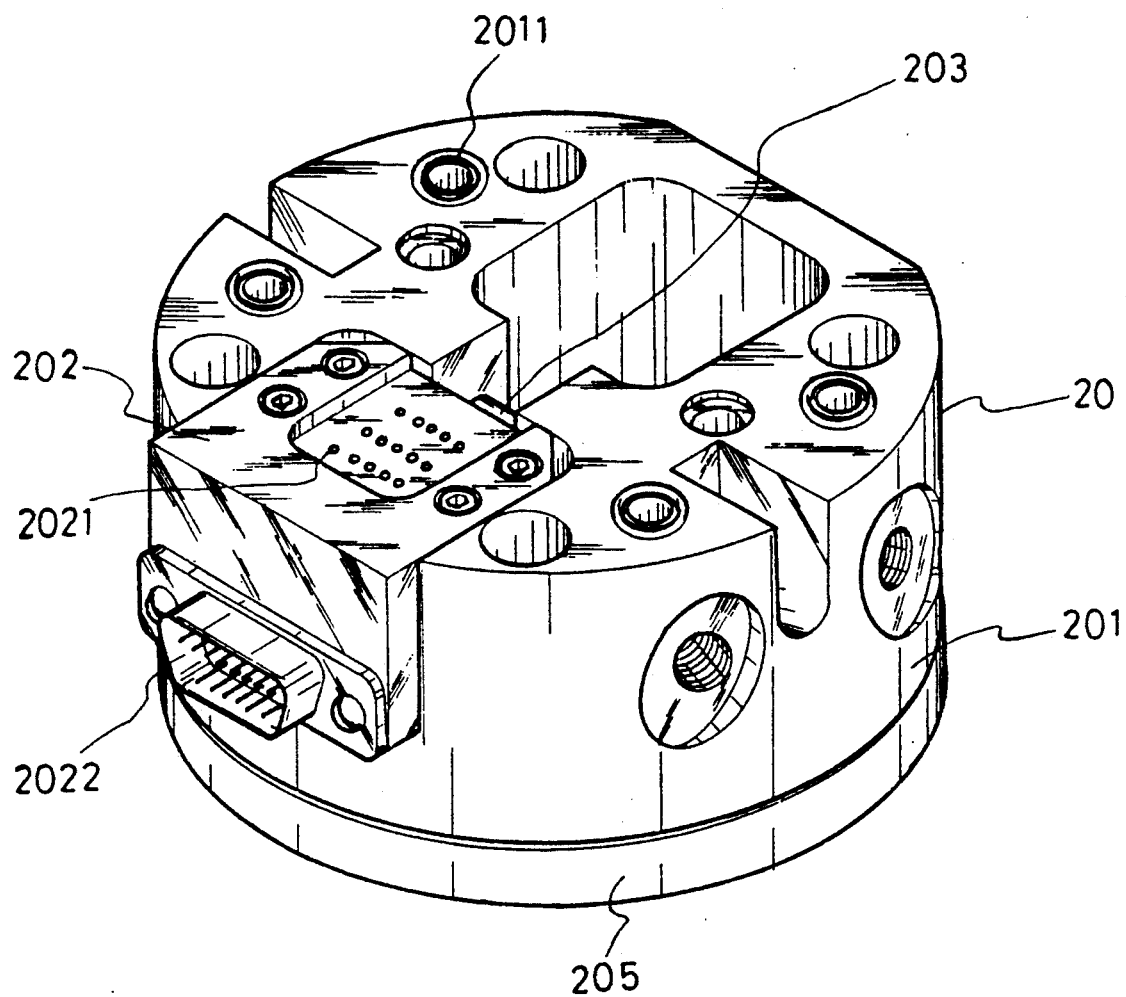
Figure 2:
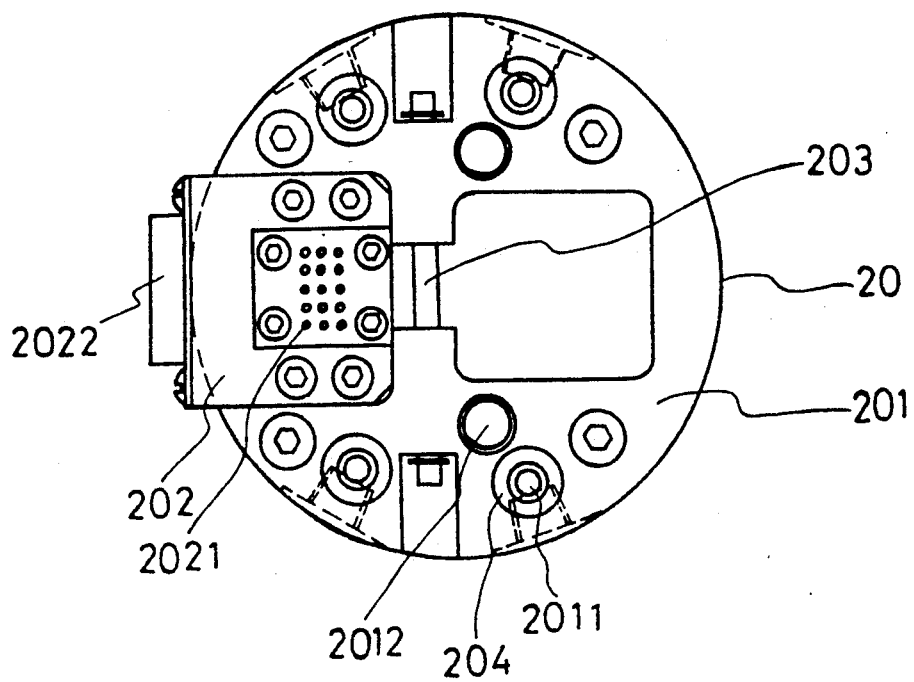
Figures 2, 3:
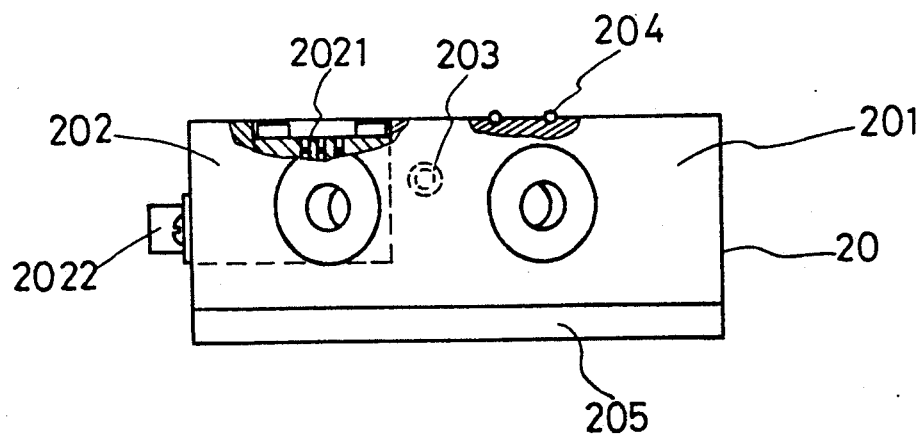
Figure 3:
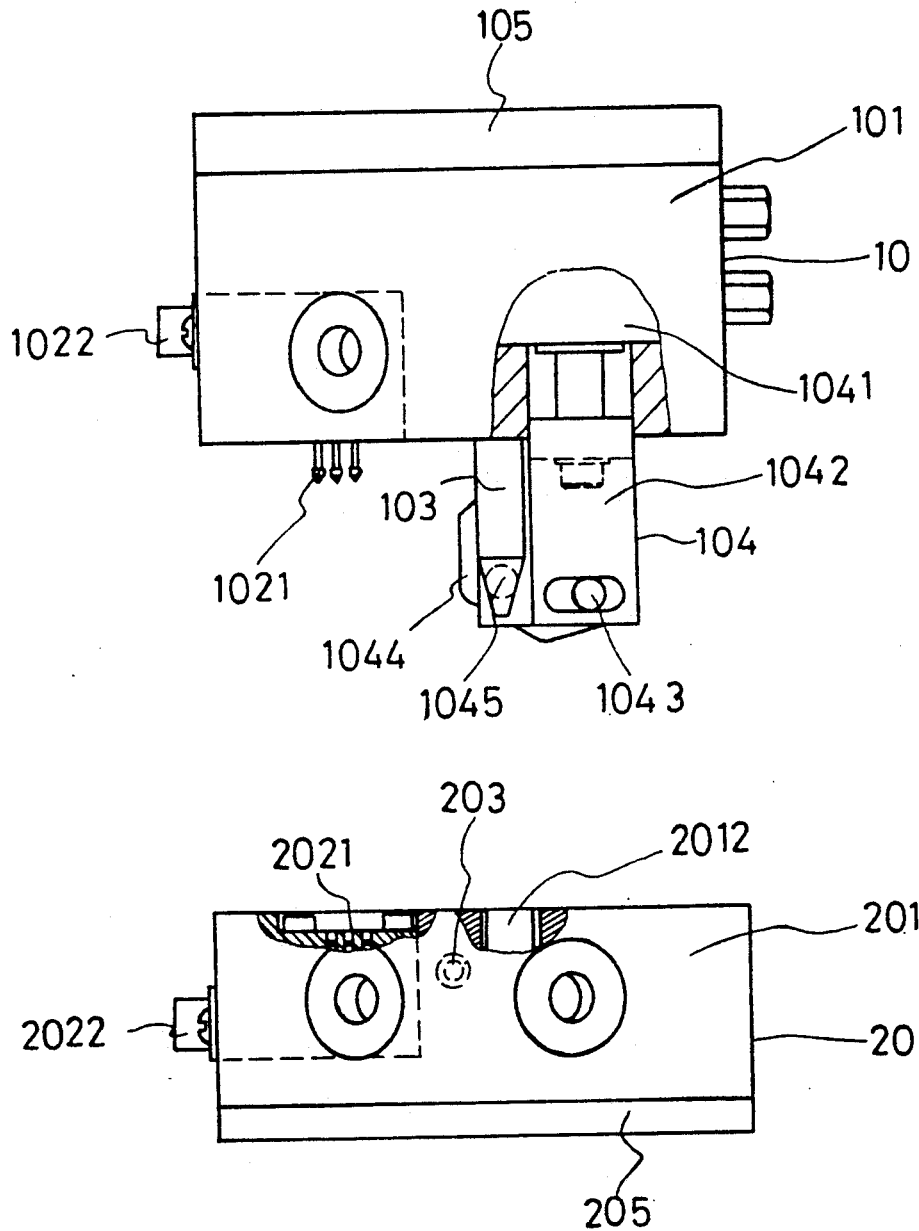

Referring to FIGS. 1-1, 1-2 and 1-3, the upper assembly 10 of the present invention is shown with a perspective view, a top view, and a front view respectively; the upper assembly 10 includes:

An electric connector 102 includes several spring contact probes 1021 and a D-type connector 1022 to be connected with a robot; two positioning pins 103; an engaging mechanism 104; a robot adapted plate 105 to be connected with the wrist of a robot; an upper part 101 for fixedly mounting the aforesaid parts. The upper part 101 is provided with a pneumatic passage 1011, whereby a compressed air is conveyed into the lower assembly 20.

Referring to FIGS. 2-1, 2-2, and 2-3, the lower assembly 20 of the present invention is illustrated with a perspective view, a top view, and a front view; the lower assembly includes:

An electric connector 202 which further includes a several receptacles 2021 and a D-type connector 2022; a rotary shaft pin 203 to be engaged with an engaging mechanism 104; a tool adapted plate 205 for connecting with a tool; a lower part 201 for fixedly mounting the aforesaid parts. The lower part 201 has a pneumatic passage 2011 for conveying a compressed air into a tool, and two positioning holes 2012 for assembling the upper and lower assemblies together. An O-ring 204 is mounted on the pneumatic passage 2011 to prevent from air leakage.

FIG. 3 illustrates a front view of the engaging mechanism according to the present invention; the engaging mechanism 104 in the upper assembly 10 includes a double-acting pneumatic cylinder 1041, two sliding yokes 1042, a supporting pin 1043, a cam 1044 and a cam shaft pin 1045. The double-acting pneumatic cylinder 1041 is used to pull (or push) the sliding yokes 1042 so as to actuate the cam 1044 to turn around the cam shaft pin 1045 for engaging or disengaging from the rotating shaft pin 203 in order to have the upper assembly 10 and the lower assembly 20 connected together or dis-connected from each other.

Figure 4:
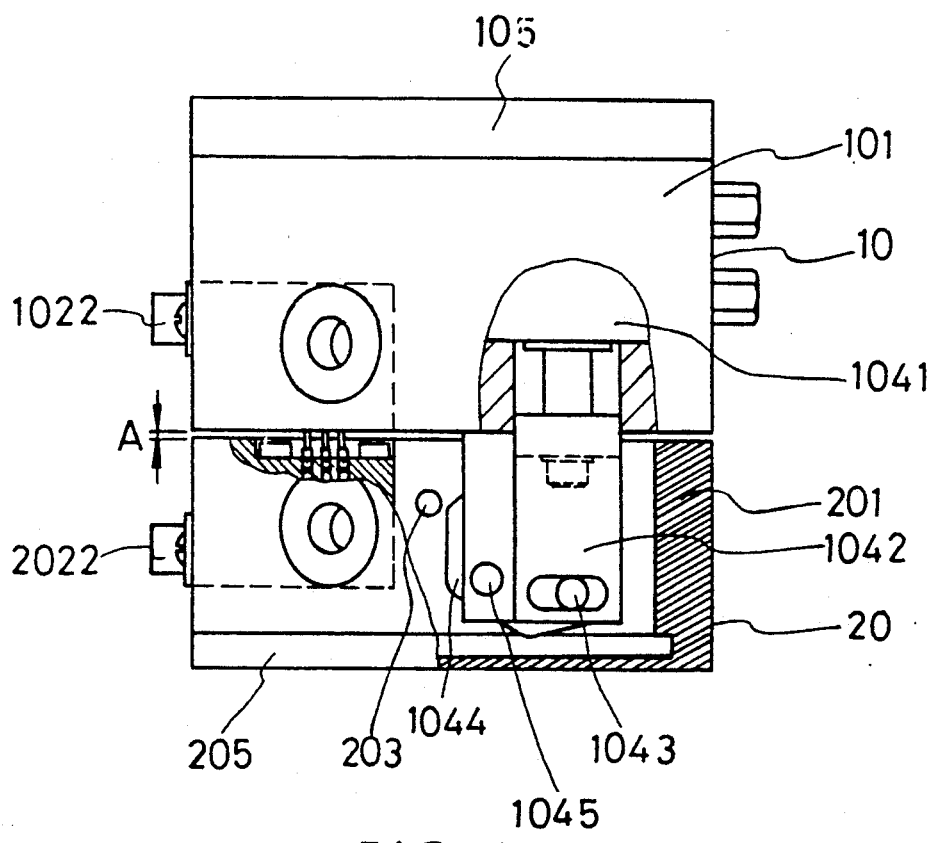
FIG. 4 is a fragmental sectional view of the engaging mechanism, being set in disengagement.

The operation of the present invention upon being mounted on a robot is described as follows:

At first, the upper assembly 10 is fixedly attached, by means of the robot adapted plate 105, to the wrist of a robot (not shown). By the robot adopted plate 205, different tools are fixedly attached to the lower assemblies 20, individually, and the lower assemblies 20 are put on a tool rack (not shown); then, a robot is moved to a position as shown in FIG. 3 to pick up the lower assembly 20 on the tool rack. (FIG. 4 shows the location of the engaging mechanism 104 when the two positioning pins 103 have been plugged into two positioning holes 2012 respectively); in that case, a space "A" ranging from 0–3 mm is left between the upper assembly 10 and the lower assembly 20.

Figure 5:
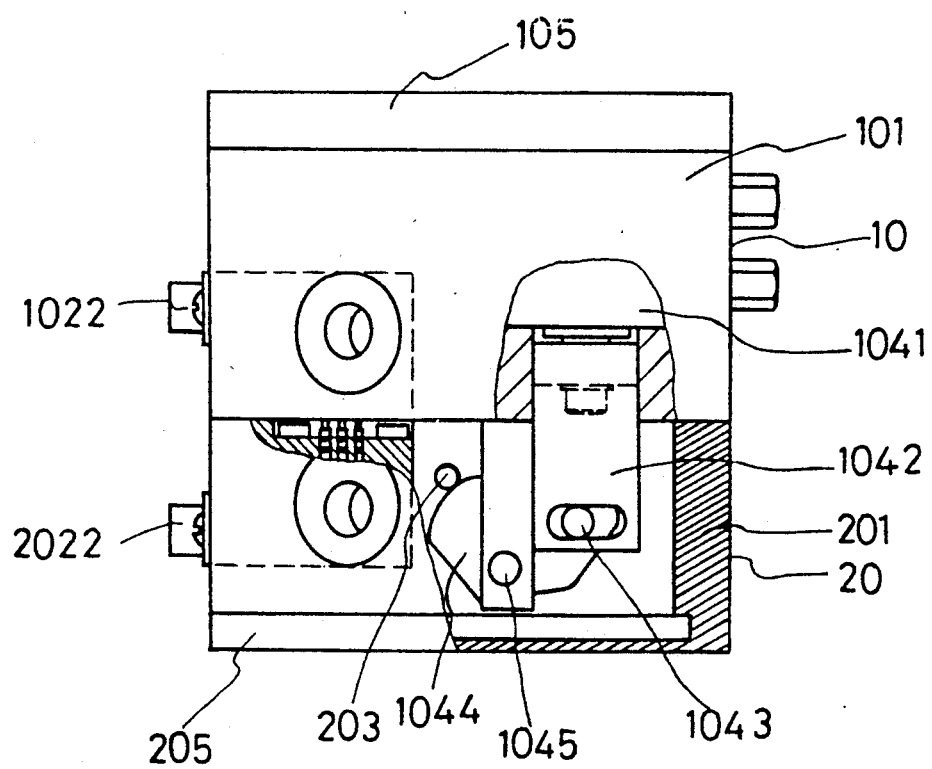
FIG. 5 is a fragmental sectional view of the engaging mechanism, being set in full engagement.

Referring to FIG. 5, the engaging mechanism connect the upper and lower assemblies 10 and 20 together, i.e., the rotary shaft pin 203 of the lower assembly 20 is located right on a curved edge of the cam 1044 upon the same moving to its upper dead point. After the sliding yokes 1042 move to their limit point, the engaging mechanism 104 will stay in a still and locked condition. If the compressed air which enter into the cyinder is lost, the weight of lower assembly 20 and the tool mounted (not shown) can only provide a radial compression force to the rotary shoft pin 203, then the cam would not turn, and the engaging mechanism 104 is kept in locked condition. When the tool-exchanging device want to disengaged from each other, the device is moved to the tool rack, and the double-acting pneumatic cylinder 1041 is actuated to drive the sliding yokes 1042 to cause the cam 1044 to turn to disengage from the rotary shaft pin. Then the two accemblies 10 and 20 are completely disengaged from each other.

Figures 1, 6:
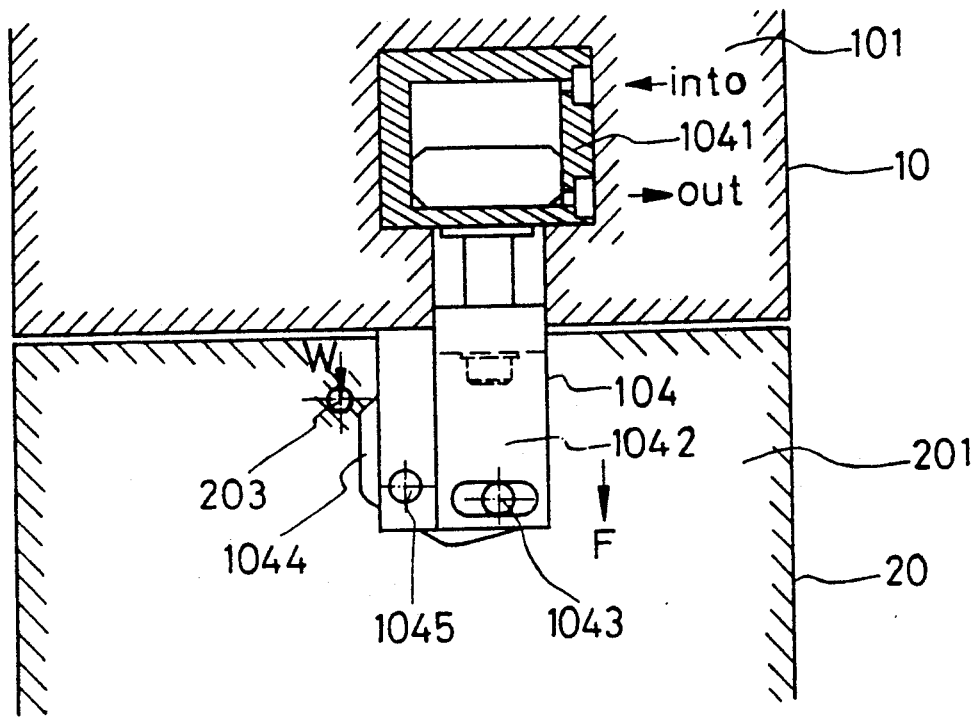
Figures 2, 6:
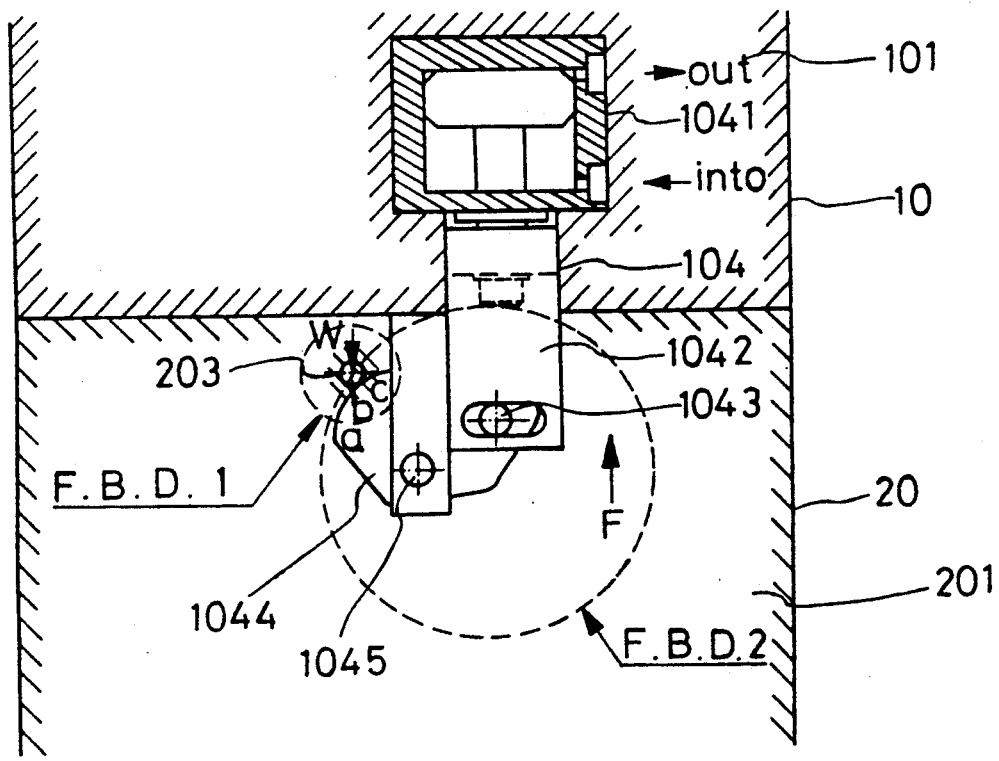

The design and operation theory of the engaging mechanism are further described as follows:

FIGS. 6-1 and 6-2 illustrate the operation of the engaging mechanism, in which "w" stands for the weight of the lower assembly 20 and the tool mounted; "F" stands for a pulling or pushing force of the double-acting pneumatic cylinder 1041 ("F" stands for a pulling force upon the double-acting pneumatic cylinder moving upwords). The engaging part of the engaging mechanism is on the curved edge abc of the cam 1044. The curve ab of the cam 1044 provides a upward movement. The curve bc is a circular arc which center is the same by means of the cam shaft pin 1045. The curve bc of the cam 1044 provides no upward movement.

When the engaging mechanism start to make engagement as shown in FIG. 6-2, "F" is considered as a pulling force to cause the cam 1044 to turn so as to have the curve ab and the rotary shaft pin 203 contacted together; in that case, the lower assembly 20 will be pulled upwards to be engaged together with the upper assembly 10 upon the rotary shaft pin 203 moving along the curve ab; When the sliding yokes 1042 continue to move upwards, the rotavy shaft pin 203 moves along the curve bc, and stops as shown in FIG. 6-2, and the cam 1044 will stop to turn; the whole engaging mechanism 104 will stop to move completely. In this time the two assemblies 10 and 20 have finished engagement.

Figures 2, 7:
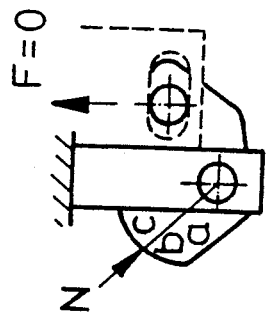
Figures 1, 7:
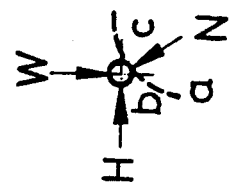

Whenever the intake of double-acting pneumatic cylinder is discontinued, i.e., F=0, we take free body diagram of the engaging mechanism (as shown in FIGS. 7-1 and 7-2). The weight "W" is a downward force. Due to the positioning pins 103, a reaction force "H" is generated; at the same time, a reaction force "N" normal to the curve bc will be applied to the rotary shaft pin 203. The three forces "W", "H" and "N" will be in a balance condition, and the reaction force "N" provides only pressure onto the cam shaft pin 1045 without causing the cam to rotite; therefore, the engaging mechanism 104 remains in still condition so as to have the device remained in engaged state (i.e., the locked condition), and the whole machine operation is maintained in safety condition.

When the engaging mechanism 104 is disengaged, the force "F" becomes a pushing force (as shown in FIG. 6-1) to compel the cam 1044 to turn, and the rotary shaft pin 203 of the lower assembly 20 will roll down along the curved edge cba of the cam 1044, and then the rotary shaft pin 203 will separate from the cam. During ba section of engagement, the weight "W" becomes a part of the disengaging force to facilitate the disengagement. In order to minimize the wear-and-tear condition of the cam, the rotary shaft pin 203 is sleeved with oiless bearing (not shown), and the engagement is rolling contact for minimizing the friction and increasing the disengagement speed as well.

We claim:

1. An upper assembly having a first surface with an attachment plate fixable to an appendage of a robot and an opposing second surface, said second surface having:
   a plurality of positioning pins extending therefrom;
   an upper electrical connector having a plurality of spring contact probes disposed therein;
   an engagement assembly having a first end fixed to said second surface of said upper assembly;
   a cam rotatably disposed about a first pin on a second end of said engagement assembly;
   a double acting pneumatic cylinder;
   a reciprocating yoke having a first end slidable on a second pin fixed in said cam and a second end connected to said pneumatic cylinder whereby said cam rotates about an axis of said first pin in response to said reciprocating yoke under the action of said double acting pneumatic cylinder;
   a lower assembly having a first surface with a tool plate fixable to a tool and an opposing second surface engageable with said upper assembly, said second surface having:
   a plurality of receptacles for receiving said positioning pins upon engagement of said upper assembly with said lower assembly;
   a lower electrical connector having a plurality of spring contact proble receptacles for receiving said spring contact probes of said upper connector;
   an engagement receptacle for receiving said engagement assembly, said cam, and said reciprocating yoke upon engagement of said upper assembly with said lower assembly;
   a rotary shaft pin disposed within said engagement receptacle for engagement by said cam upon engagement of said upper assembly with said lower assembly and upon rotation of said cam in response to said reciprocating yoke under the action of said double-acting pneumatic cylinder, whereby said cam engages and disengages said rotary shaft pin in response to said reciprocating yoke under the action of said double-acting pneumatic cylinder to secure and release said upper assembly to said lower assembly, respectively.

* * * * *